Patented May 6, 1952

2,596,073

UNITED STATES PATENT OFFICE 2,596,073

PROCESS OF SELECTIVELY REDUCING FERROUS CHLORIDE IN THE SOLID PHASE FROM A SOLID MIXTURE OF $FeCl_2$ AND $MnCl_2$

Marion Ernest Graham, Parma, and Edward A. Beidler, Columbus, Ohio; said Beidler assignor, by mesne assignments, to Henry L. Crowley & Co., Inc., West Orange, N. J., a corporation of New Jersey No Drawing. Application June 14, 1951, Serial No. 231,654

5 Claims. (Cl. 75—31)

The present invention relates to a process of selectively reducing ferrous chloride in the solid phase from a solid mixture of $FeCl_2$ and $MnCl_2$, and more particularly to the selective reduction of ferrous chloride from such a solid mixture by hydrogen, so as to produce substantially pure iron and preferably also so as to produce in the unreduced remainder a mixture of these two chlorides having a sufficiently high proportion of manganese chloride that upon subsequent treatment of the two chlorides, a product containing manganese and iron in a commercially usable proportion (considered from the point of view of manganese) can be obtained.

It has been known for a considerable time that ferrous chloride may be reduced by hydrogen, at least in the solid phase. Work has also been done on the reduction of ferrous chloride in the liquid and gaseous phase by hydrogen.

The prior art is not altogether clear in regard to the reducibility of manganese chloride by hydrogen. Mellor, 1932 edition, volume 12, page 356, states that manganese chloride is not reducible by hydrogen. On the same page of Mellor, another researcher is said to state that manganese chloride may be reduced to some extent by hydrogen. From the original article of this other researcher, it appears that the reaction proceeds very slowly and only to a slight extent. Research work done incident to the development of the present invention seems to show that manganese chloride can be reduced by hydrogen, but that this reaction is difficult and slow and appears to proceed toward an equilibrium, which is not only slowly attained, but also represents a relatively small percentage reduction.

The only prior art known, wherein mixed ferrous chloride and manganese chloride were attempted to be reduced simultaneously, is the patent to Kinney, No. 2,290,843, granted July 21, 1942. In this patent mixed manganese chloride and iron chloride are taught to be reduced in the solid phase by a hydrogen-containing gas, in a manner such that both the manganese and iron are completely reduced. The research work done in accordance with the present invention shows results contrary to the teachings of this patent as will appear hereinafter.

The present invention may, therefore, be summarized as comprising a process for selectively reducing ferrous chloride from a solid mixture containing chloride of iron and manganese ($FeCl_2$ and $MnCl_2$) to form substantially pure metallic iron. In order that the present process may be successfully carried out, the initial weight ratio of these chlorides ($FeCl_2$ to $MnCl_2$) in the starting mixture should be greater than 1:5. In most instances it will be greater than 1:1. The chlorides may be mixed with any amount of other inert material, such as gangue, which may come from an ore in which these metals are found together and from which the metals have been chloridized without removal of the gangue. Such other material as may be present should be inert insofar as the present reaction is concerned, i. e., the reduction of ferrous chloride with hydrogen.

Hydrogen is used as a reducing agent in this case, although it may be mixed with more or less other gases, which are inert insofar as the present reaction is concerned. From this point of view, therefore, the gaseous material, which is brought into contact with the solid material, may be said to contain hydrogen as its essential active reducing ingredient. Inasmuch as hydrogen is relied upon to effect the reduction, there must be at least sufficient hydrogen present during the time permitted for the reaction to react with all the chloride, which is introduced into the reaction zone combined with iron in the form of ferrous chloride.

The temperature of the reaction may be from a minimum of about 350° C., below which reaction is uneconomically slow, to about 675° C., which is the melting point of ferrous chloride, the higher melting of the iron and manganese chlorides in question (since these chlorides tend to alloy in the higher temperature ranges and as ferrous chloride is the principal ingredient under most circumstances). The preferred range for the temperature of the reaction is, however, from about 500° C. to about 625° C.

It has been found that the reaction proceeds with great selectivity whenever the weight proportion of ferrous chloride to manganese chloride is greater than about 1:5, but that whenever the weight ratio of these two chlorides is reduced to about this ratio, both chlorides seem to reduce together, and very slowly. For this reason, it is normally advantageous to stop the reaction as soon as the remaining unreduced chlorides are at about this ratio. If this be done, the reduced metallic material is found to contain more than 99% metallic iron.

The present application is related to our prior and copending application, Serial No. 218,064, filed March 28, 1951, and entitled "Process of Selectively Reducing Ferrous Chloride in the Vapor Phase from a Gaseous Mixture of Manganese and Ferrous Chlorides." The present case is, however, limited to reaction in the solid phase, while said copending application, as indicated by its title, is limited to the reaction in the vapor phase.

The detailed requirements of the present process will now be described. Possible variations in the raw material composition, including the mixed chlorides $FeCl_2$ and $MnCl_2$, have been adequately discussed above. This raw material may be produced in any way and at any place, and if produced elsewhere, it may be introduced into a reducing zone. Material may also be produced in effect in situ in the reducing zone by any prior appropriate treatment. In any event, the present process may be considered as starting with the material to be treated in solid form in a reducing zone of any suitable nature.

The character of the apparatus in which the process of the present invention is carried on is per se no part of this invention. Many types of gas-to-solid contact apparatus are suitable for the purpose, as will be evident from the present description to those skilled in the art. For this reason, the apparatus is herein referred to generally as a "reducing zone" wherein solid material may be brought into reactive contact with a gas.

The gas used as the reducing gas in accordance with the present invention must either consist wholly of or contain hydrogen. Thus, as hydrogen is the only active reducing ingredient relied upon in accordance with the present process, there must be sufficient hydrogen present at one time or another during the carrying on of the process to react with all the chlorine which is introduced into the reducing zone in the form of ferrous chloride. Under most normal circumstances, it is preferred to use a substantial excess of hydrogen over and above the minimum stoichiometric amount required. The hydrogen may be admixed with more or less other gases, which are not necessarily inert per se, but which must be inert insofar as the reduction reaction in question is concerned. In other words, such other gases must not substantially hinder the reduction reaction according to the present process. In a preferred form of the present process, the gas used consists essentially of hydrogen, the only gases present in addition to hydrogen being relatively small amounts of relatively inert gases, such as water vapor and perhaps also nitrogen or those present as impurities normally associated with commercial hydrogen due to its process of manufacture, which additional or diluent gases are present by inadvertence rather than by intention. The amount of diluent gas present is not a critical factor in accordance with the present invention, as long as there is sufficient hydrogen present to carry out the desired reaction.

The temperature limits chosen for the reaction are broadly from a low limit of about 350° C. to a high limit of about 675° C. The reasons for this choice are that at temperatures below about 350° C., the rate of reaction is wholly uneconomical. Even at this temperature, the rate is quite slow as will be evidenced by one of the examples which follows. The upper limit of temperature for the reaction is chosen as that at which the higher melting of the two chlorides in question ($FeCl_2$ and $MnCl_2$), namely, $FeCl_2$, will melt. In this connection, it may be noted that the melting point of $MnCl_2$ is about 650° C. The higher melting point temperature is chosen as the two chlorides tend to alloy or fuse together in the higher temperature ranges, so that the melting point of the fused or alloyed mixture may approach the higher melting point temperature; and also as it is usually expected that there will be a relatively large amount of $FeCl_2$ present in respect to the amount of $MnCl_2$.

While the extreme limits of temperature are as given above, it is usually preferred to operate the present process within a somewhat narrower temperature range, namely, from about 500° C. to about 625° C. The reason for this is that in this preferred temperature range the reaction rate is sufficiently high to be attractive from a commercial point of view, and also the range is not extended up to the point at which either of the chlorides becomes so soft as to tend to agglomerate with the remaining solid materials and thereby to retard the reaction for this reason. These temperature limits will be brought out in the examples hereinafter given.

As above stated, it has been found that the weight ratio of $FeCl_2$ to $MnCl_2$ should be greater than about 1 to 5 in the starting material. The process may be advantageously carried on so as selectively to reduce ferrous chloride until the remaining unreduced ferrous chloride has a weight ratio of 1 to 5 in respect to the remaining manganese chloride. Attempts to carry the reduction further, once this ratio is reached, result in the process operating very slowly; and also both chlorides seem to be reduced together to a greater extent at least than in the preferred composition range. Thus, if the process is stopped when the weight ratio of the unreduced ferrous to manganese chlorides is about 1 to 5, it is found that the unreduced metallic material contains a practical minimum of unreduced iron. This will be demonstrated by the examples hereinafter given. Further, the weight ratio of unreduced ferrous to manganese chlorides of about 1 to 5 provides a desired material, which may be separated from any insoluble or non-volatile materials and may then be treated by any suitable subsequent process per se forming no part of the present invention, to provide a material which is desirable from the point of view of its manganese content. For example, a material comparable to ferro-manganese (80% manganese) may be thus prepared.

While subsequent separation of the solid materials following the selective reduction step above described is not necessarily employed as in integral part of the process of the present invention, it is customarily performed following the present process. This subsequent separation step may be effected in any one of a variety of ways. One of these ways is to leach out the water-soluble materials from the remaining solid material following the selective reduction step by the use of a suitable solvent, such as water. In this way, $FeCl_2$ and $MnCl_2$ may be jointly and simultaneously dissolved out from the water-insoluble portion, and separated therefrom by suitable process, such as decantation or filtration. The dissolved chlorides may then be suitably treated for the recovery of values therefrom, for example, by evaporation and by any desired subsequent treatment, the details of which form no part of the present invention.

Another method of separation contemplated for use in accordance with the present invention is to raise the temperature of the solid material remaining after the selective reduction step aforesaid, until both the ferrous chloride and the manganese chloride are volatilized. The mixed vapors of these two chlorides may then be separated from the non-volatile remaining solid material and the vapor subsequently condensed for such further treatment and use as may be desired.

The process of the present invention may be illustrated by the following examples:

EXAMPLE I

In order to illustrate the effect of temperature upon the rate and selectivity of the reduction, a series of tests were made by reducing mixtures of solid $FeCl_2$ and $MnCl_2$ in which the ratio of $FeCl_2$ to $MnCl_2$ by weight was 10:1. The reductions were carried out by passing hydrogen at the rate of about 2 liters per minute through a 1½" diameter Vycor tube which contained about 21 grams of the thoroughly mixed chlorides.

When the reduction was carried out at a temperature of 300° C. for a period of 222 minutes, it was found that about 2% of the $FeCl_2$ together with an unmeasurably small amount of $MnCl_2$, were reduced to metal. Because of the very slow rate at which the reaction goes on, this temperature is considered to be below the practical operative temperature range of the process.

When a mixture having the same initial composition was reduced for the same length of time at a temperature of about 350° C., it was found that 6.0% of the $FeCl_2$ was reduced to metallic iron, while only a negligible amount of the $MnCl_2$ was reduced to metallic manganese, giving a reduced metallic product containing an amount of manganese too low for proper analysis with the balance metallic iron. It is, therefore, considered that 350° C. is the minimum temperature at which the reaction will proceed at a rate sufficient to make the process practically and commercially operative.

At temperatures above 350° C., the rate of reaction increases rapidly with an increase in temperature as can be readily seen from the data in Table I, below:

*Table I*

| Test No. | Reduction temp. (deg. centigrade) | Time (min.) | Weight Ratio $FeCl_2$ to $MnCl_2$ in starting mixture | Per Cent $FeCl_2$ Reduced | Per Cent Manganese in Reduced Product |
|---|---|---|---|---|---|
| a | 400 | 222 | 10:1 | 44.0 | 0.017 |
| b | 450 | 209 | 10:1 | 65.0 | 0.023 |
| c | 500 | 125 | 10:1 | 97.5 | 0.08 |
| d | 500 | 63 | 10:1 | 82.2 | 0.07 |
| e | 550 | 93 | 10:1 | 99.0 | 0.09 |
| f | 625 | 30 | 10:1 | 71.3 | 0.07 |

In all the reductions recorded in the table above, the amount of manganese chloride reduced to metallic manganese was considered negligible, such that the amount of manganese in the reduced product amounted to less than 0.1%. In every case the reduced product was quite pure with respect to metallic iron, containing more than 99% metallic iron. It will further be evident from the table that as the temperature increases, less time is required to reduce substantially all of the $FeCl_2$ to metallic iron; but that the purity of the reduced product is not adversely affected by the completion of the reaction, since a high degree of selectivity of reduction is maintained throughout.

EXAMPLE II

Although the reduction reaction is highly selective giving a reduced product containing more than 99% metallic iron in the tests set forth above in Table I, it has been found that the selective character of the reduction is greatly diminished unless the weight ratio of $FeCl_2$ to $MnCl_2$ in the original starting mixture is greater than 1:5. When this weight ratio is as low as 1:5, the reduction reaction is not nearly as selective and a reduced product containing substantial amounts of manganese is obtained. To illustrate this decrease of selectivity when the initial weight ratio of $FeCl_2$ to $MnCl_2$ is only 1:5 in the starting mixture, results of the following tests may be given:

A mixture containing one part by weight of solid $FeCl_2$ to 5 parts by weight of solid $MnCl_2$ was reduced in a stream of hydrogen for 60 minutes at a temperature of 400° C. At the end of this time it was found that 12.5% of the $FeCl_2$ had been reduced to metallic iron and, although less than 1% of the $MnCl_2$ originally present had been reduced to metallic manganese, the reduced product contained about 6.5% metallic manganese by weight. Thus, a product containing an undesirably high amount of manganese, for the purpose of the present invention, was obtained.

When a mixture containing the same proportion of solid $FeCl_2$ and $MnCl_2$ was reduced for 30 minutes in a like manner at a temperature of 550° C., it was found that at the end of this period 45% of the $FeCl_2$ had been reduced to metallic iron and the reduced product contained about 4% metallic manganese. This product also was considered to be too high in manganese to be within the scope of the present invention.

From another point of view, it will be obvious that even when the starting material is relatively richer in ferrous chloride in respect to manganese chloride than the minimum ratio of 1:5, for example, when using a starting ratio of 10:1 as in the tests given in Table I above, as long as the ferrous chloride is selectively reduced, the ratio of $FeCl_2$ to $MnCl_2$ in the remaining unreduced material will drop progressively. When this ratio gets down to about 1:5, further reduction is both quite slow with respect to reduction prior to this time and also manganese chloride is being reduced at a much greater rate than that occurring in the prior and preferred portion of the reduction process. It is desired, therefore, to stop the reduction process when the ratio of $FeCl_2$ to $MnCl_2$ in the remaining unreduced material reaches about 1:5. This is demonstrated by the results of test c given in Table I above, wherein the unreduced material remaining after 125 minutes has a ratio of about 1:4. Under these circumstances, it is noted that .08% of the final reduced product was manganese. This much does not represent an undesired amount of manganese in the reduced product and also does not involve an undesired loss of manganese from the remaining unreduced product, which may be treated by other means to form a valuable manganese-containing product as aforesaid. If, on the other hand, the reduction were continued for any substantial time after the ratio of $FeCl_2$ to $MnCl_2$ is less than 1:5, then, due to the rate of reaction being very slow, much time would be lost and further, due to the undesired large reduction of manganese in respect to the reduction of iron, a substantial amount of the manganese would be lost from the point of view of the recoverability of manganese in the unreduced material. At the same time, the reduced material, while containing a large amount of manganese, would not be commercially useful as a source of manganese as it has too little manganese to serve as a source of this metal, while having too much to be considered pure iron.

For all these reasons, therefore, it is considered that the ratio of FeCl₂ to MnCl₂ of about 1:5 is the lower limit for the original starting material and further that this ratio is about the limit beyond which the reduction should not be continued in practice.

While there is herein described limits of the process and certain of the critical and non-critical varients thereof, further varients will occur to those skilled in the art from the foregoing description and are to be considered as equivalents within the purview of the present invention and within the scope of the appended claims, which are to be construed validly as broadly as the state of the prior art permits.

What is claimed is:

1. The process of selectively reducing FeCl₂ to metallic iron from a material including mixed, solid FeCl₂ and MnCl₂, and in which the weight ratio of FeCl₂ to MnCl₂ in said material prior to such selective reduction is greater than 1:5, comprising contacting said material in solid form and in a temperature range from about 350° C. up to about 675° C. with a gas, the essential active ingredient of which consists of hydrogen, and which gas is substantially free of HCl, by passing said gas substantially continuously past said solid FeCl₂ and MnCl₂, and discontinuing the process as aforesaid before the ratio (by weight) of FeCl₂ to MnCl₂ decreases below about 1:5.

2. The process in accordance with claim 1, wherein said material is maintained during the process in the temperature range of about 500° C. to about 625° C.

3. The process according to claim 1, wherein said gas consists essentially of hydrogen.

4. The process of selectively reducing FeCl₂ to metallic iron from a material including mixed, solid FeCl₂ and MnCl₂, and in which the weight ratio of FeCl₂ to MnCl₂ in said material prior to such selective reduction is greater than 1:1, comprising contacting such mixed material in solid form and in a temperature range from about 350° C. to about 675° C. with a gas, the essential active ingredient of which consists of hydrogen, and which gas is substantially free of HCl, by passing said gas substantially continuously past said solid FeCl₂ and MnCl₂, and discontinuing the process as aforesaid before the ratio (by weight) of FeCl₂ to MnCl₂ decreases below about 1:5.

5. The process in accordance with claim 1, wherein the reduction as aforesaid is continued only for a time such that the reduced metallic product contains greater than 99% metallic iron.

MARION ERNEST GRAHAM.
EDWARD A. BEIDLER.

REFERENCES CITED

The following references are of record in the file of this patent:

UNITED STATES PATENTS

| Number | Name | Date |
|---|---|---|
| 1,288,422 | Jones | Dec. 17, 1918 |
| 2,067,874 | Brown et al. | Jan. 12, 1937 |
| 2,290,843 | Kinney | July 21, 1942 |

OTHER REFERENCES

Comprehensive Treatise on Inorganic and Theoretical Chemistry, vol. 12, pages 353 and 356, and vol. 14, page 20. Edited by Mellor. Published in 1935 by Longmans, Green and Co., New York.